US012792618B2

(12) United States Patent
Vouitsis et al.

(10) Patent No.: US 12,792,618 B2
(45) Date of Patent: Nov. 10, 2026

(54) COMPUTING SYSTEMS AND METHODS FOR RANKING A SET OF PASSAGES BASED ON THEIR RELEVANCE TO A QUERY USING AN LLM

(71) Applicant: The Toronto-Dominion Bank, Toronto (CA)

(72) Inventors: Noël Vouitsis, Markham (CA); Jiapeng Wu, Toronto (CA); Zhaoyan Liu, Toronto (CA); Yi Sui, Newmarket (CA); Shiyi Hou, Toronto (CA); Graham Andrew Warner, Victoria (CA); Maksims Volkovs, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 19/043,200

(22) Filed: Jan. 31, 2025

(65) Prior Publication Data

US 2026/0228229 A1 Aug. 6, 2026

(51) Int. Cl.

| | |
|---|---|
| ***G06F 17/00*** | (2019.01) |
| ***G06F 7/00*** | (2006.01) |
| ***G06F 16/2457*** | (2019.01) |
| ***G06N 3/084*** | (2023.01) |

(52) U.S. Cl.

CPC ....... *G06F 16/24578* (2019.01); *G06N 3/084* (2013.01)

(58) Field of Classification Search

CPC .......................... G06F 16/24578; G06N 3/084

USPC .......................................................... 707/749

See application file for complete search history.

(56) References Cited

U.S. PATENT DOCUMENTS

| | | | | |
|---|---|---|---|---|
| 11,914,601 | B2 * | 2/2024 | Oonishi | G06F 16/24578 |
| 12,164,542 | B1 | 12/2024 | Rahman | |
| 12,436,979 | B1 | 10/2025 | Gofman | |
| 2024/0370476 | A1 * | 11/2024 | Madisetti | G06F 16/3329 |
| 2025/0028852 | A1 | 1/2025 | Chowanski | |
| 2025/0030547 | A1 | 1/2025 | Chowanski | |
| 2025/0068646 | A1 | 2/2025 | Rahman | |

(Continued)

OTHER PUBLICATIONS

Yuksekgonul et al. TextGrad: Automatic "Differentiation" via Text. arxiv.org. Datasheet [online], published Jun. 11, 2024, 41 pages. [retrieved on Apr. 22, 2025]. Retrieved from <https://arxiv.org/abs/2406.07496>.

(Continued)

*Primary Examiner* — Pavan Mamillapalli

(74) *Attorney, Agent, or Firm* — Marks & Clerk; Paul Horbal; Jennifer Davy

(57) ABSTRACT

Methods and systems for ranking a set of passages based on their relevance to a query. The methods comprise providing a set of one or more ranking prompt to a first LLM which causes the first LLM to generate a ranking of a test set of passages with respect to a test query; using a second LLM to generate an evaluation metric based on the ranking of the test set of passages relative to a reference ranking; using a set of one or more LLMs to generate, based on the evaluation metric, textual feedback on the set of one or more ranking prompt; generating a modified set of one or more ranking prompt based on the textual feedback; and providing the modified set of one or more ranking prompt to the first LLM which causes the first LLM to rank the set of passages with respect to the query.

19 Claims, 7 Drawing Sheets

(56) References Cited

U.S. PATENT DOCUMENTS

| | | | | |
|---|---|---|---|---|
| 2025/0077939 | A1 | 3/2025 | Tabatabaei | |
| 2025/0086151 | A1 | 3/2025 | Arora | |
| 2025/0104700 | A1 | 3/2025 | Henault-Ethier | |
| 2025/0138838 | A1 | 5/2025 | Ramesh | |
| 2025/0139267 | A1 | 5/2025 | Zykh | |
| 2025/0173170 | A1 | 5/2025 | Glynn-Udrow | |
| 2025/0238410 | A1 | 7/2025 | Arora | |
| 2025/0245071 | A1 | 7/2025 | Ionescu | |
| 2025/0245511 | A1 | 7/2025 | D'Agostino | |
| 2025/0272321 | A1* | 8/2025 | Cui | G06F 16/3334 |
| 2025/0307442 | A1 | 10/2025 | Nimpha | |
| 2025/0315365 | A1 | 10/2025 | Kaul | |
| 2025/0335492 | A1 | 10/2025 | Vouitsis | |
| 2026/0017496 | A1* | 1/2026 | Gofman | G06N 3/0475 |
| 2026/0037873 | A1* | 2/2026 | Putta | G06N 3/048 |
| 2026/0044496 | A1* | 2/2026 | Liang | G06F 16/243 |

OTHER PUBLICATIONS

Sun et al. Is ChatGPT Good at Search? Investigating Large Language Models as Re-Ranking Agents. arxiv.org. Datasheet [online], published Apr. 19, 2023, 20 pages. [retrieved on Apr. 22, 2025]. Retrieved from <https://arxiv.org/abs/2304.09542>.

* cited by examiner

COMPUTING SYSTEMS AND METHODS FOR RANKING A SET OF PASSAGES BASED ON THEIR RELEVANCE TO A QUERY USING AN LLM

TECHNICAL FIELD

The disclosed example embodiments relate to computer-implemented methods and systems for ranking a set of passages based on their relevance to a query, and more particularly, for ranking a set of passages based on their relevance to a query using a large language model (LLM).

BACKGROUND

There are many applications, such as information retrieval, where it is desirable to be able to rank a set of passages with respect to their relevance to a query. Information retrieval (IR) is the systematic process of extracting relevant information from a corpus of documents in response to queries. Some IR systems implement a two-stage retrieval system. In the first stage, which may be referred to as the retriever stage, a retriever model is used to retrieve passages from a corpus of documents that are relevant to the query. Each passage may be a portion of a document in the corpus of documents or all of a document in the corpus of documents. The retrieval model may implement techniques such as embedding. In embedding, an embedding model is used to compute a text embedding (which may also be referred to as a vector or simply an embedding) for each document that represents the words in the passage, then the embedding model is used to compute a text embedding for a received query. The text embedding for the query is then compared to the text embeddings for the passages to compute a similarity score therefor. The passages with the top k similarity scores may then be identified (and retrieved) for processing in the second stage.

While retriever models are very efficient and effective at organizing and sorting through a large corpus of documents, they may not be able to accurately rank the passages they identify. Accordingly, in the second stage, which may be referred to as the reranker stage, the passages identified in the first stage based on their relevance to the query. The reranker stage is often implemented by a reranker model. A reranker model is a language model that is designed to compute a score for each of the passages identified in the first stage that indicates the relevance of the passage to the query. The scores can then be used to reorder the passages identified in the first stage by their relevance to the query. The objective of the reranking is generally to provide a more precise ranking than that obtained in the first phase.

SUMMARY

The following summary is intended to introduce the reader to various aspects of the detailed description, but not to define or delimit any invention.

A first aspect provides a system for ranking a set of passages based on their relevance to a query, the system comprising: a memory, a communication interface, and at least one processor operatively coupled to the memory and the communication interface; the at least one processor configured to: (a) provide a set of one or more ranking prompt to a first large language model (LLM) which causes the first LLM to generate a ranking of a test set of passages based on their relevance to a test query; (b) use a second LLM to generate an evaluation metric indicating a quality of the ranking of the test set of passages relative to a reference ranking of the test set of passages; (c) use a set of one or more LLMs to generate, based on the evaluation metric, textual feedback on the set of one or more ranking prompt; (d) generate a modified set of one or more ranking prompt based on the textual feedback; and (e) provide the modified set of one or more ranking prompt to the first LLM which causes the first LLM to rank the set of passages based on their relevance to the query.

Using the set of one or more LLMs to generate, based on the evaluation metric, textual feedback on the set of one or more ranking prompt may comprise backpropagating the evaluation metric to the set of one or more ranking prompt using the set of one or more LLMs to generate a textual gradient of the evaluation metric with respect to the set of one or more ranking prompt.

Using the set of one or more LLMs to generate, based on the evaluation metric, textual feedback on the set of one or more ranking prompt may comprises (i) using the set of one or more LLMs to generate textual feedback on the ranking of the test set of passages based on the evaluation metric, and (ii) using the set of one or more LLMs to generate the textual feedback on the set of one or more ranking prompt based on the feedback on the ranking of the test set of passages.

Using the set of one or more LLMs to generate the textual feedback on the ranking of the test set of passages based on the evaluation metric may comprise providing an LLM of the set of one or more LLMs, the evaluation metric, inputs to the second LLM which caused the second LLM to generate the evaluation metric, and a first feedback prompt that causes the LLM of the set of one or more LLMs to generate the textual feedback on the ranking of the test set of passages.

The inputs to the second LLM which caused the second LLM to generate the evaluation metric may comprise the ranking of the test set of passages, the reference ranking of the test set of passages, and an evaluation prompt which caused the LLM to generate the evaluation metric.

Using the set of one or more LLMs to generate the textual feedback on the set of one or more ranking prompt based on the feedback on the ranking of the test set of passages may comprise providing an LLM of the set of one or more LLMs with the textual feedback on the ranking of the test set of passages, the ranking of the test set of passages, inputs to the first LLM which caused the first LLM to generate the ranking of the test set of passages, and a second feedback prompt that causes the LLM of the set of one or more LLMs to generate the textual feedback on the set of one or more ranking prompt.

The inputs to the first LLM which caused the first LLM to generate the ranking of the test set of passages may comprise the test set of passages, the test query, and the set of one or more ranking prompt.

Generating a modified set of one or more ranking prompt based on the textual feedback may comprises using a third LLM to generate the modified set of one or more ranking prompt based on the set of one or more ranking prompt and the textual feedback.

Using the third LLM to generate the modified set of one or more ranking prompt based on the set of one or more ranking prompt and the textual feedback may comprise providing the third LLM the set of one or more ranking prompt, the textual feedback and an optimizer prompt which instructs the third LLM to generate the modified set of one or more ranking prompt based on the one or more ranking prompt and the textual feedback.

Each passage in the test set of passages and the set of passages may comprise all or a portion of a document in a corpus of documents.

The at least one processor may be configured to execute (a) to (c) for each of a plurality of different test set of passages from the corpus of documents to generate textual feedback on the set of one or more ranking prompt for each of the plurality of different test set of passages; and the modified set of one or more ranking prompt is based on the textual feed on the set of one or more ranking prompt for each of the plurality of different test set of passages.

The at least one processor may be configured to, prior to performing (e), repeat (a) to (d) with the modified set of one or more ranking prompt.

The textual feedback on the set of one or more ranking prompt may comprise interpretable natural language describing how the set of one or more ranking prompt should be changed to improve the evaluation metric.

The set of one or more ranking prompt may comprise a system prompt and modifying the set of one or more ranking prompt may comprise modifying the system prompt.

The at least one processor may be further configured to: receive the query; and generate a response to the query based on the ranking of the set of passages based on their relevance to the query.

The at least one processor may be further configured to: use an information retrieval system to identify, from a corpus of documents, the set of passages on the basis that the passages in the set of passages are relevant to the query; and generating the response to the query based on the ranking of the set of passages based on their relevance to the query may comprise: selecting a subset of the set of passages based on the ranking of the set of passages; and using an LLM to generate the response to the query based on the subset of the set of passages.

A second aspect provides a method for ranking a set of passages based on their relevance to a query, the method executed in a computing environment comprising at least one processor, a communication interface, and memory, and the method comprising: (a) providing a set of one or more ranking prompt to a first large language model (LLM) which causes the first LLM to generate a ranking of a test set of passages based on their relevance to a test query; (b) using a second LLM to generate an evaluation metric indicating a quality of the ranking of the test set of passages relative to a reference ranking of the test set of passages; (c) using a set of one or more LLMs to generate, based on the evaluation metric, textual feedback on the set of one or more ranking prompt; (d) generating a modified set of one or more ranking prompt based on the textual feedback; and (e) providing the modified set of one or more ranking prompt to the first LLM which causes the first LLM to rank the set of passages based on their relevance to the query.

Using the set of one or more LLMs to generate, based on the evaluation metric, textual feedback on the set of one or more ranking prompt may comprise (i) using the set of one or more LLMs to generate textual feedback on the ranking of the test set of passages based on the evaluation metric, and (ii) using the set of one or more LLMs to generate the textual feedback on the set of one or more ranking prompt based on the feedback on the ranking of the test set of passages.

Generating a modified set of one or more ranking prompt based on the textual feedback may comprise using a third LLM to generate the modified set of one or more ranking prompt based on the set of one or more ranking prompt and the textual feedback.

The textual feedback on the set of one or more ranking prompt may comprise interpretable natural language describing how the set of one or more ranking prompt should be changed to improve the evaluation metric.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Figure 1:
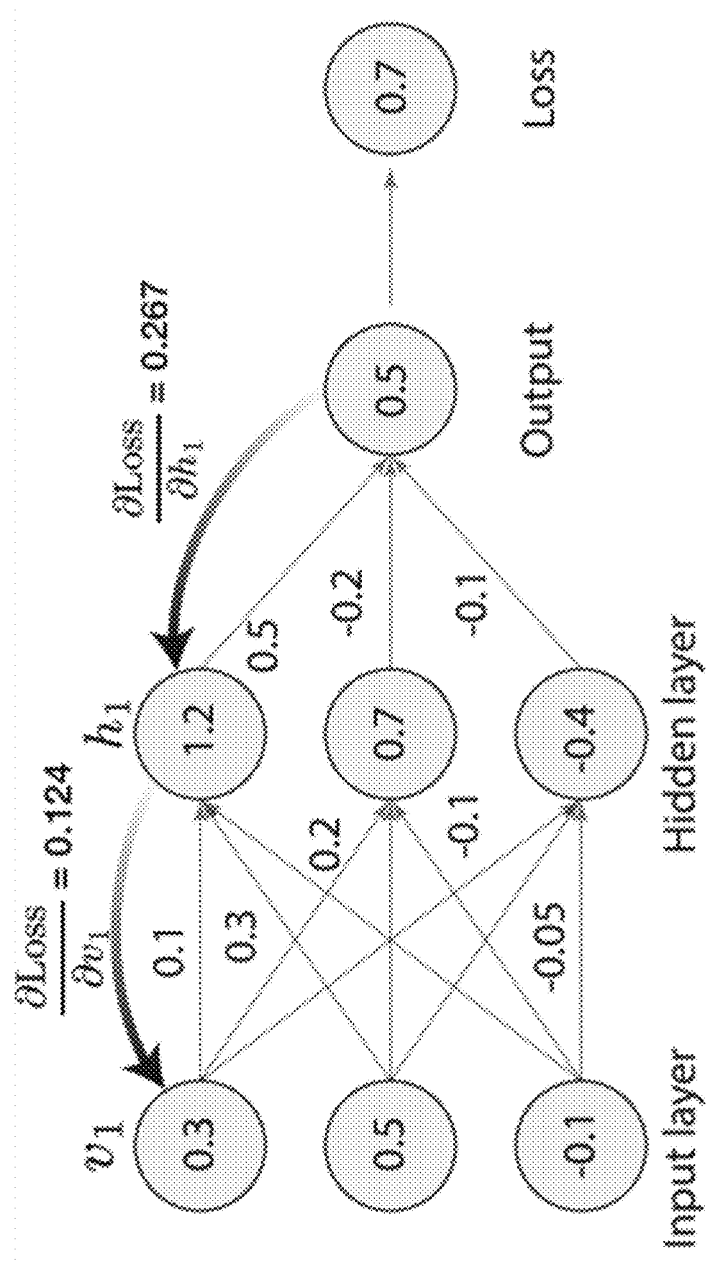
FIG. 1 is a schematic diagram illustrating backpropagating a loss in the output of an example neural network through an example neural network to generate a numerical gradient of the loss with respect to an input variable.

Recently large language models (LLMs) have been used to implement re-rankers. More particularly, LLMs have been used to rank a set of passages based on their relevance to a query. Specifically, an LLM is provided a query, the set of passages and a set of one or more ranking prompt which instruct the LLM to rank the set of passages based on their relevance to the query. In response to the set of one or more ranking prompt, the LLM outputs a ranking of the passages. Using an LLM to rank a set of passages based on their relevance to a query may be referred to as RankGPT.

The set of one or more ranking prompt may be configured to cause the LLM to perform the ranking in any suitable manner. In some cases, the set of one or more ranking prompt may be configured to cause the LLM to perform listwise ranking. In listwise ranking, the LLM is provided with all of the passages to be ranked at the same time. Each passage is identified by a unique identifier like [1], [2], etc. The set of one or more ranking prompt then instructs the LLM to generate a ranked permutation of these passages such as [2]>[3]>[1]. The following is an example of a listwise ranking prompt.

The following are passages related to a query {{query}}
[1]{{passage_1}}
[2]{{passages_2}}
(more passages)
Rank these passages based on their relevance to the query.

It has been shown that LLMs, such as, but not limited to, GPT-3.5 can, in some cases, achieve top zero-shot performance by prompting general LLMs to re-rank documents. However, while LLMs are trained on a vast amount of data from various fields, if the corpus of documents from which the passages were selected comprise information that is not known to the LLM performing the ranking (e.g., information that did not form part of the LLM's training dataset)—because, for example, the information relates to a specific domain or to an enterprise's internal knowledge base—the LLM may not be able to accurately rank the passages.

One solution to this issue has been to develop a domain-specific set of one or more ranking prompt that includes information related to the domain that the corpus of documents relates such as, but not limited to, definitions of domain-specific terms and/or jargon etc., which aid the LLM in ranking the passages. In some cases, a set of one or more ranking prompt may comprise a system prompt and one or more instruction prompts. A system prompt defines the general approach, tone etc., and can include information such as, but not limited to, information about the task that the LLM is being asked to perform, the role the LLM is playing etc. In contrast, an instruction prompt, which may also be referred to as a user prompt, provides task specific instructions to the LLM. In such cases, it may be the system prompt that is modified to be domain specific.

A domain-specific set of one or more ranking prompt may be developed manually through an iterative process that is based on human feedback from domain experts. For example, an LLM may be asked via a set of one or more ranking prompt to rank a set of passages based on their relevance to a query. The query, the passages and the ranking generated by the LLM may then be provided to a domain expert who provides feedback on the LLM's ranking. A prompt engineer may then modify the set of one or more ranking prompt (e.g., the system prompt thereof) based on the feedback received from the domain expert to improve the ranking performed by the LLM. For example, the prompt engineer may modify the set of one or more ranking prompt (e.g., the system prompt thereof) to add a definition of a domain-specific term that it appears the LLM didn't understand. The process may then be repeated with the modified set of one or more ranking prompt. However, this iterative process is both labour and time intensive.

Recently there has been a body of work related to using LLMs to provide textual feedback to improve a parameter or variable of an artificial intelligence (AI) system, such as an AI system with one or more LLMs. One such example of this work is TextGrad which is described in Yuksekgonul et al. "TextGrad: Automatic "Differentiation" via Text" (https://arxiv.org/pdf/2406.07496). TextGrad is a framework for performing automatic "differentiation" via text. More particularly, in the Text Grad framework textual feedback generated by LLMs is backpropagated through an AI system to improve parameters thereof in a similar manner that backpropagation and automatic differentiation can be used to optimize the parameters of a neural network for a specific task.

Specifically, to train a neural network using backpropagation and numerical gradients, a forward pass of the neural network is performed with a set of inputs to generate an output. A loss function is then evaluated which compares the generated output to a desired output to generate a loss. The loss is then backpropagated through the network of the neural network to compute the numerical gradient of the loss with respect to each weight via the chain rule (this is referred to as a backward pass of the neural network). The gradient of the loss with respect to each weight indicates a direction and magnitude to adjust the weight to minimize the loss function. Each weight is then adjusted accordingly (e.g., in accordance with gradient descent algorithm).

The same concept can be applied to any input to the neural network to determine how to change that input to improve the loss. For example, as shown in FIG. 1, which reproduces FIG. 1*a* of Yuksekgonul et al, the loss (Loss) can be backpropagated through the neural network to generate the gradient $$\left(\frac{\partial \text{Loss}}{\partial v_1}\right)$$

of the loss with respect to the input $v_1$ via the chain rule by first computing the gradient $$\left(\frac{\partial \text{Loss}}{\partial h_1}\right)$$

of the loss with respect to the output of the first layer $h_1$.

The TextGrad framework applies this concept to AI systems to improve one or more parameters thereof by, instead of computing numerical gradients, computing textual gradients and backpropagating the textual gradients through the AI system. A textual gradient is described as information and interpretable natural language criticism to the variables, describing how a variable should be changed to improve the system. For example, FIG. 2, which reproduces FIG. 2*a* of Yuksekgonul et al., shows an AI system with two LLMs. In the forward pass, the first LLM receives a prompt and a query and generates a response to the query. That response is fed to a second LLM along with other data and the second LLM generates a final output for the AI system. In the TextGrad framework, to improve the initial prompt, another LLM, is used to evaluate the final output with respect to, for example, the ground truth output to generate a loss. A textual gradient of the loss with respect to the initial prompt is generated via backpropagation. Specifically, an LLM is used to compute the textual gradient of the loss with respect to the response (i.e., the output of the first LLM)

$$\left(\frac{\partial \text{Loss}}{\partial \text{Response}}\right).$$

The textual gradient may, for example, provide textual comments on how to improve the response to improve the loss. Then an LLM is used to compute the textual gradient of the loss with respect to the initial prompt $$\left(\frac{\partial \text{Loss}}{\partial \text{Prompt}}\right)$$

based on the textual gradient of the loss with respect to the output of the first LLM $$\left(\frac{\partial \text{Loss}}{\partial \text{Response}}\right).$$

This textual gradient may, for example, provide textual comments on how to improve the initial prompt to improve the response, which will improve the loss. The initial prompt may then be modified based on the feedback.

The Applicant has determined that the performance of an LLM in ranking passages with respect to a corresponding query can be improved, especially when the passages are generated from a corpus of documents that comprise information that is not known to the LLM, by using textual feedback generated by one or more LLMs to improve the set of one or more ranking prompt. Accordingly, described herein are systems and methods for ranking, using a ranking LLM, a set of passages based on their relevance to a query, wherein the ranking prompt provided to the ranking LLM is automatically generated from textual feedback generated from a set of one or more feedback LLMs on one or more test sets of one or more ranking prompt used in a testing phase.

In the examples described herein, a set of one or more ranking prompt is provided to the ranking LLM to rank a test set of passages based on their relevance to a corresponding test query. An evaluation LLM is then used to evaluate the ranking of the test set of passages with respect to a reference ranking and generate an evaluation metric based thereon. One or more feedback LLMs are then used to generate textual feedback (e.g., one or more suggestions for improvement) on the initial set of one or more ranking prompt based on the evaluation metric. A modified set of one or more ranking prompt is then generated based on the feedback. In some cases, an LLM is used to generate the modified set of one or more ranking prompt based on the feedback. The modified set of one or more ranking prompt can then be provided to the ranking LLM to rank a set of passages based on their relevance to a query.

Figure 3:
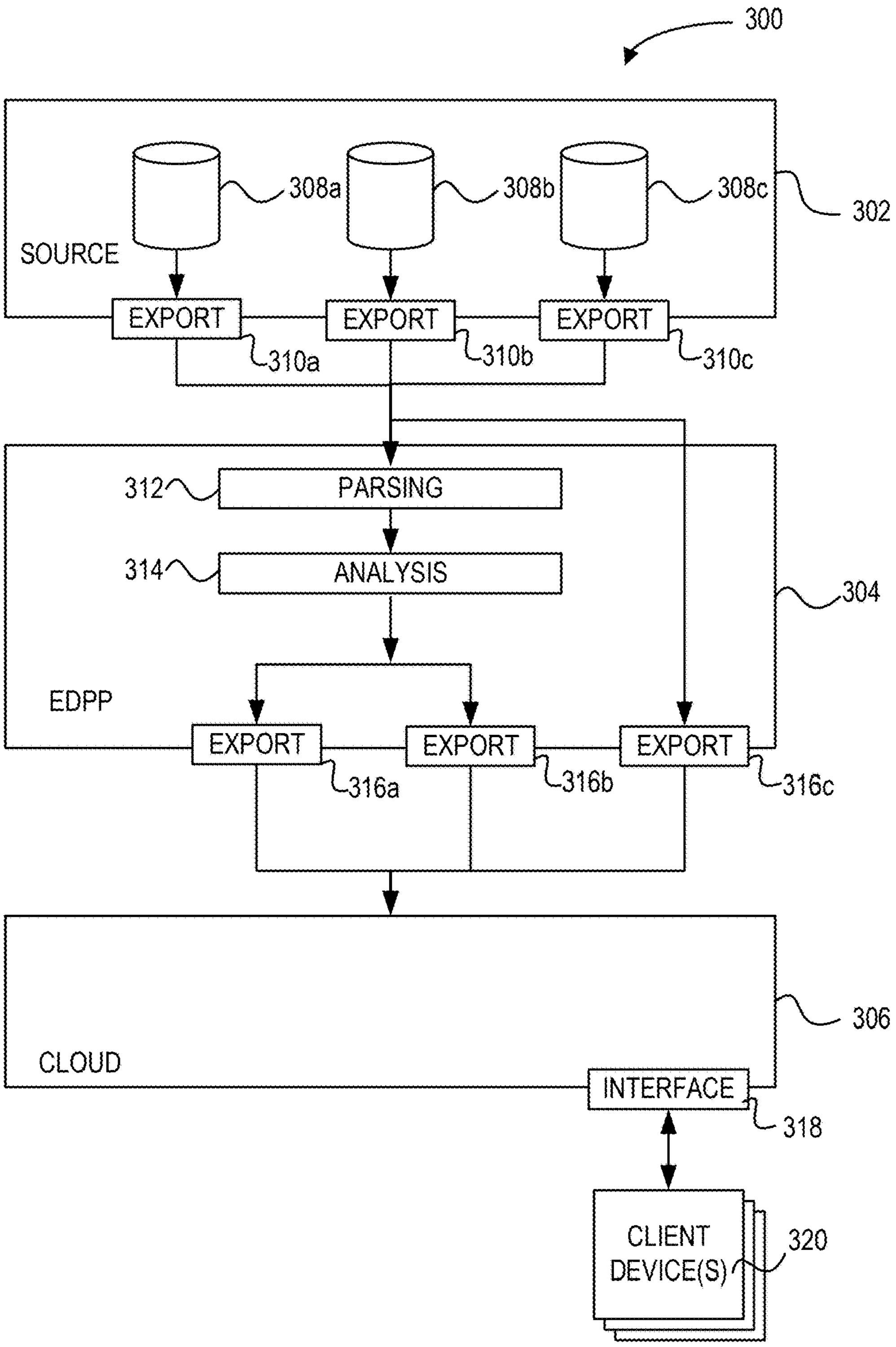
FIG. 3 is a block diagram of an example system for ranking a set of passages based on their relevance to a query.

Reference is now made to FIG. 3, which illustrates a block diagram of an example computing system 300 for ranking, using an LLM, a set of passages based on their relevance to a query. Computing system 300 comprises a source database system 302, an enterprise data provisioning platform (EDPP) 304 operatively coupled to the source database system 302, and a cloud-based computing cluster 306 that is operatively coupled to the EDPP 304.

Source database system 302 has one or more databases, of which three are shown for illustrative purposes: database 308*a*, database 308*b* and database 308*c*. One or more of the databases of the source database system 302 may contain confidential information that is subject to restrictions on export. One or more export modules 310*a*, 310*b*, 310*c* may periodically (e.g., daily, weekly, monthly, etc.) export data from the databases 308*a*, 308*b*, 308*c* to the EDPP 304. In some instances, the data is exported on an ad hoc basis.

EDPP 304 receives source data exported by the export modules 310*a*, 310*b*, 310*c* of source database system 302, processes it and exports the processed data to an application database within the cloud-based computing cluster 306. For example, a parsing module 312 of EDPP 304 may perform extract, transform and load (ETL) operations on the received source data.

In many environments, access to the EDPP may be restricted to relatively few users, such as administrative users. However, with appropriate access permissions, data relevant to a document or group of documents (e.g., a client document) may be exported via reporting and analysis module 314 or an export module 316*a*, 316*b*, 316*c*. In particular, parsed data can then be processed and transmitted to the cloud-based computing cluster 306 by a reporting and analysis module 314. Alternatively, one or more export modules 316*a*, 316*b*, 316*c* can export the parsed data to the cloud-based computing cluster 306.

In some cases, there may be confidentiality and privacy restrictions imposed by governmental, regulatory, or other entities on the use or distribution of the source data. These restrictions may prohibit confidential data from being transmitted to computing systems that are not "on-premises" or within the exclusive control of an organization, for example, or that are shared among multiple organizations, as is common in a cloud-based environment. In particular, such privacy restrictions may prohibit the confidential data from being transmitted to distributed or cloud-based computing systems, where it can be processed by machine learning systems, without appropriate anonymization or obfuscation of personal identifiable information (PII) in the confidential data. Moreover, such "on-premises" systems typically are designed with access controls to limit access to the data, and thus may not be resourced or otherwise suitable for use in broader dissemination of the data. In some cases, to comply with such restrictions, one or more module of EDPP 304 may "de-risk" data tables that contain confidential data prior to transmission to cloud-based computing cluster 306. In some cases, this de-risking process may obfuscate or mask elements of confidential data, or may exclude certain elements, depending on the specific restrictions applicable to the confidential data. The specific type of obfuscation, masking or other processing is referred to as a "data treatment."

The cloud-based computing cluster 306 is configured to rank, using an LLM, a set of passages based on their relevance to a query. The cloud-based computing cluster 306 includes an interface 318, which facilitates data communication with one or more client devices 320.

In some environments, the EDPP may be omitted.

Figure 4:
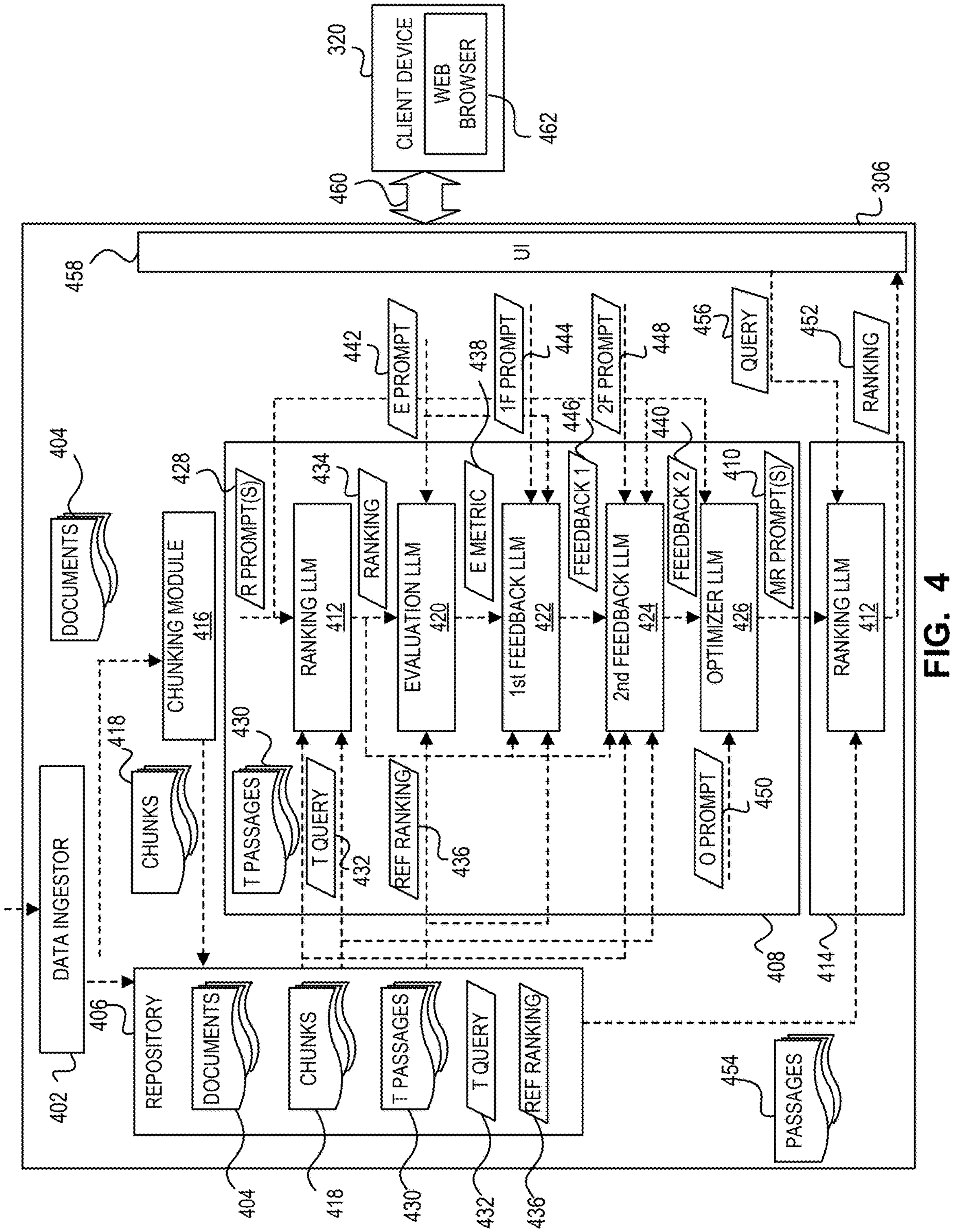
FIG. 4 is a block diagram of an example implementation of the cloud-based computing cluster of FIG. 3 configured to rank a set of passages based on their relevance to a query.

Reference is now made to FIG. 4, which illustrates an example implementation of the cloud-based computing cluster 306 of FIG. 3. In the example shown in FIG. 4 the cloud-based computing cluster 306 comprises a data ingestor 402 for receiving a set of documents 404, a repository 406 for storing the received set of documents 404, a first system 408 for automatically generating a final set of one or more ranking prompt 410 to cause a ranking LLM 412 to rank a set of passages (from the set of documents 404) based on their relevance to a corresponding query, and a second system 414 for using the ranking LLM 412 and the generated final set of one or more ranking prompt 410 to generate a ranking of a set of passages (from the set of documents 404) based on their relevance to a corresponding query.

In some cases, one or more components of the cloud-based computing cluster 306 may be implemented by one or more computers within the cloud-based computing cluster, such as not limited to, computer 600 described below with respect to FIG. 6. In some cases, one or more components of the cloud-based computing cluster 306 may be implemented as virtual machines within the cloud-based computing cluster.

The data ingestor 402 is configured to receive from, for example, the EDPP 304 or the source database system 302, a set of documents 404 and store the received set of documents 404 in the repository 406. In some cases, the documents in the set of documents 404 are files that include text. In some cases, different data formats of documents or files (or both), and which include text, can be used in the systems described herein. In some cases, the set of documents 404 may comprises a corpus of documents that comprise information from which answers to queries can be found.

In some cases, the set of documents 404 may represent a set of web pages. The web pages may include an enterprise's internal web pages and/or external web pages. In such cases, there may be a document (or file) per web page. Where the documents represent web pages the documents may be in HTML (Hyper Text Markup Language) format, or they may be in a different format, such as a markdown format. In some case, the documents may be received at the data ingestor 402 in an original format (e.g., HTML format) and converted, by a format converter (not shown) to another format, such as a markdown format. Converting a document in HTML format to a markdown format removes HTML-related characteristics that are not relevant to human understanding which may help an LLM, such as the ranking LLM 412, from misinterpreting the HTML code. Thus, markdown is a simpler format, vs HTML, that may help improve an LLM's understanding of the document. Where the received documents are converted to another format at the cloud-based computing cluster 306, the set of documents 404 may be stored in the repository 406 in only the converted format or both the original format (e.g., HTML) and the converted format.

The repository 406 is a storage device or set of storage devices that can be used to store digital or electronic data, including digital or electronic documents. The repository 406 is designed to store the received set of documents 404 but may also be used to store other electronic information or data.

In some cases, the cloud-based computing cluster 306 may also comprise a chunking module 416 that is configured to subdivide or partition each document in the set of documents 404 into one or more portions or chunks 418. Each portion or chunk 418 comprises all or a subset of a document in the set of documents 404. The process of subdividing a document into smaller portions or chunks may be referred to as chunking. The chunks 418 for the set of documents 404 may be stored in the repository 406. Since one or more of the documents may be large, chunking the set of documents 404 may help one or more of the LLMs process the set of documents, making their output more precise and relevant.

In some cases, the chunking module 416 may be configured to segment the text in a document using semantic chunking. In other cases, the chunking module 416 may be configured to segment the text in a document using document-based chunking, which identifies and uses a structure of a document—e.g., headers, paragraphs or spaces. Other examples of chunking computations which may be implemented by the chunking module 416 include recursive chunking and fixed-sized chunking. For example, the chunking module 416 may be configured to select chunks so not to exceed a certain size so as to fit within the context window of an LLM, such as the ranking LLM 412. In other examples, the chunking module 416 may be configured to use combinations of these chunking methods. Other currently known and future known chunking computations can be used by the chunking module 416. The chunking module 416 may be configured to receive the set of documents 404 from the data ingestor 402 or the chunking module 416 may be configured to retrieve the set of documents 404 from the repository 406.

The first system 408 is configured to generate the final set of one or more ranking prompt 410 to cause a ranking LLM 412 to rank a set of passages (from the set of documents 404) based on their relevance to a corresponding query. The first system 408 comprises the ranking LLM 412, an evaluation LLM 420, and one or more feedback LLM 422, 424. The first system 408 may, in some cases, also comprise an optimizer LLM 426. In the example of FIG. 4 the ranking LLM 412, the evaluation LLM 420, the feedback LLMs 422, 424 and the optimizer LLM 426 are shown as different LLMs, however, in other examples, two or more of the LLMs 412, 420, 422, 424, 426 may be combined. In other words, in other examples, a single LLM may perform the functions described as being performed by two or more of the ranking LLM 412, the evaluation LLM 420, a feedback LLM 422 or 424 and the optimizer LLM 426. For example, a single LLM may perform the ranking LLM 412 and the evaluation LLM 420 functions.

The first system 408 is configured to generate the final set of one or more ranking prompt 410 to cause a ranking LLM 412 to rank a set of passages (from the set of documents 404) based on their relevance to a corresponding query by providing a set of one or more ranking prompt 428 to the ranking LLM 412 to rank a test set of passages 430 (from the set of documents 404) based on their relevance to a corresponding test query 432. The evaluation LLM 420 is then used to evaluate the ranking 434 of the test set of passages 430 in relation to a reference ranking 436 and generate an evaluation metric 438 based therein. One or more of the feedback LLMs 422, 424 are then used to generate textual feedback (e.g., one or more suggestions for improvement) on the initial set of one or more ranking prompt 428 based on the evaluation metric 438. The textual feedback 440 is then used to generate a modified set of one or more ranking prompt 410 based on the feedback 440. In some cases, the optimizer LLM 426 is used to generate the modified set of one or more ranking prompt 410 based on the initial set of one or more ranking prompt 428 and the feedback 440.

More specifically, the ranking LLM 412 is provided a test query 432, a test set of passages 430 (from the set of documents 404) identified as being related to the test query 432, and a set of one or more ranking ("R") prompts 428 which instruct the ranking LLM 412 to generate a ranking 434 of the test set of passages 430 based on their relevance to the test query 432.

The test set of passages 430 are passages of text from the set of documents 404. Each passage of the test set of passages 430 may be a whole document of the set of documents 404 or a portion of a document, such as a chunk of the set of chunks 418. The test set of passages 430 and the corresponding test query 432 are pre-selected as having a corresponding reference ranking 436 therefor. The reference ranking 436 is a ranking of the test set of passages 430 in relation to their relevance to the test query 432 which may have been generated by a domain expert. The test query 432 may be representative of the type of query that may be made with respect to the set of documents 404. The test set of passages 430, the test query 432 and/or the reference ranking 436 may be stored in the repository 406. As described in more detail below, in some cases, there may be multiple (test set of passages, test query, reference ranking) triples and a plurality of the triples may be processed by the first system 408.

In some cases, the set of one or more ranking prompt 428 may comprise a system prompt and one or more instruction prompts. A system prompt defines the general approach, tone etc. and can include information such as, but not limited to, information about the task that the LLM is being asked to perform, the role the LLM is playing etc. In contrast, an instruction prompt, which may also be referred to as a user prompt, provides task specific instructions to the LLM.

The set of one or more ranking prompt 428 are configured to cause the ranking LLM 412 to perform the ranking in any suitable manner. In some cases, the set of one or more ranking prompt 428 may be configured to cause the ranking LLM 412 to perform listwise ranking. In listwise ranking the ranking LLM 412 is provided with all of the passages to be ranked at the same. Each passage is identified by a unique identifier like [1], [2], etc. The prompt then instructs the ranking LLM to generate a ranked permutation of these passages such as [2]>[3]>[1] The following is an example of a listwise ranking prompt which may be included in the set of one or more ranking prompt 428.

The following are passages related to a query {{query}}
[1]{{passage_1}}
[2]{{passage_2}}
(more passages)
Rank these passages based on their relevance to the query.

In other cases, the set of one or more ranking ("R") prompt 428 may be configured to implement pairwise ranking prompting (PRP). PRP has proven to be an efficient method for an LLM to rank a plurality of documents by relevance to a query. As its name suggests, pairwise ranking prompting involves prompting the ranking LLM 412 to compare and rank pairs of passages. The results of the pairwise rankings are then used to generate a final ranking of the passages.

In one implementation of PRP, each passage is individually ranked against each other passage. A score is then assigned to each passage based on the outcome of the pairwise rankings. The scores assigned to the passages are then used to rank the passages. For example, since LLMs may be sensitive to text orders in prompts, for each pair of passages $p_1$ and $p_2$, two rankings may be performed by the ranking LLM 412—i.e., a ranking of $p_1$ and $p_2$, and a ranking of $p_2$ and $p_1$. If both rankings produce a consistent result (e.g., both rankings indicate that $p_1$ is more relevant than $p_2$ to a query) then the identified passage may be allocated 1 point and the unidentified passage is not allocated any points. In contrast, if the rankings produce inconsistent results (e.g., one ranking indicates that $p_1$ is more relevant than $p_2$ to a query, and the other ranking indicates that $p_2$ is more relevant than $p_1$ to the query) then each passage may be allocated 1 point. The total score for a passage may then be the sum of the points allocated to that passage. The passages can then be ranked based on their total scores.

While the described implementation of PRP is simple to implement, is prompt order independent, and has proven to be quite effective, it requires $O(N^2)$ prompts/calls to the ranking LLM 412 per query, where N is the number of passages to be ranked for a query. Accordingly, in some cases PRP may be implemented in another manner. For example, a pairwise sorting algorithm, such as, but not limited, heap sort and bubble sort, may use the output of a pairwise ranking from the ranking LLM 412 as a comparator for the sorting algorithm. This reduces the number of prompt/calls to the ranking LLM 412 to O(N log N). In another example, a sorting window approach which starts at a bottom of a list and compares and swaps documents with a stride of 1 based on the output of a pairwise ranking from the ranking LLM 412.

Causing the ranking LLM 412 to rank a pair of passages (A, B) with respect to a query (Q) may comprise providing the ranking LLM 412 with a pair ranking few-shot prompt that comprises one or more example (Q, A, B, answer) quadruples, and instructions for the ranking LLM 412 to determine whether A or B is more relevant to Q. An example pair ranking few-shot prompt, which may be included in the set of one or more ranking prompt 428, is shown below.

Given the following query and passages, please generate which passage is more relevant for answering the query. The output should be only A or B.
Query: {{Example Query}}
Passage A {{Example Passage A}}
Passage B {{Example Passage B}}
Answer: {{A or B}}
Now your turn:
Query: {{Query}}
Passage A {{Passage A}}
Passage B {{Passage B}}
Answer: {{A or B}}

There are benefits and drawbacks related to each ranking technique described above. For example, pairwise ranking can be performed efficiently since the pairwise rankings can be performed in parallel, but performing a comparison between each passage pair can be computationally expensive. Furthermore, since in pairwise ranking the ranking LLM 412 only considers two passages at a time without information about the other passages it may not be able to effectively rank all the passages. In contrast, listwise ranking allows the ranking LLM 412 to see all the passages at the same time, but a ranking LLM 412 may struggle to perform listwise ranking on larger sets of passages. Testing has shown that listwise ranking can be effectively performed by closed-source LLMs, such as, but not limited to GPT-4.

In other cases, the set of one or more ranking ("R") prompt 428 may be configured to cause the ranking LLM 412 to perform the ranking in another manner. For example, the set of one or more ranking ("R") prompt 428 may be configured to cause the ranking LLM 412 to perform pointwise ranking.

The initial or starting set of one or more ranking ("R") prompt 428, and specifically the system prompt thereof, may not comprise any domain-specific information. For example, the system prompt may be a basic Chain-of-Thought (CoT) prompt that tells the LLM to "Think step-by-step".

LLMs are a class of machine learning models that have been trained on massive amounts of data so that they can understand and generate natural language. The ranking LLM 412 may be implemented by any LLM that can perform a ranking of a set of passages with respect to a query. In some cases, the ranking LLM 412 may be implemented by a Microsoft Azure™ Open AI LLM (e.g., a GPT-4o, GPT-4 Turbo, GPT-4, or GPT-3.5 Turbo model). In some cases, the LLM used to implement the ranking LLM 412 may be selected based on the ranking technique implemented. For example, GPT-4 has proven to perform pairwise ranking efficiently.

The evaluation LLM 420 is used to evaluate the ranking 434 generated by the ranking LLM 412 with respect to the reference ranking 436. Specifically, the evaluation LLM 420 is provided the ranking 434 generated by the ranking LLM 412, the reference ranking 436 and an evaluation ("E") prompt 442 which causes the evaluation LLM 420 to evaluate the ranking 434 generated by the ranking LLM 412 with respect to the reference ranking 436 and generate an evaluation metric 438 based thereon. The evaluation metric 438 indicates the quality of the ranking 434 generated by the ranking LLM 412 with respect to the reference ranking 436. In some cases, the evaluation metric 438 may be a numerical metric.

Any suitable evaluation ("E") prompt 442 may be used. An example evaluation ("E") prompt 442 is shown below. It will be evident that this is just an example.

Below is set of passages, a query, the ground truth ranking of the passages based on their relevance to the query, and a predicted ranking of the passages based on their relevance to the query. Is the predicted ranking correct, i.e., the same as the ground truth ranking? Say only 1 (yes) or 0 (no).

Passage 0: {passage 0}

Passage 1: {passage 1}

Passage 2: {passage 2}

Query: {query}

Ground truth ranking: {reference ranking}

Predicted ranking: {predicted ranking}

As described above, LLMs are a class of machine learning models that have been trained on massive amounts of data so that they can understand and generate natural language. The evaluation LLM 420 may be implemented by any LLM that can evaluate a ranking of a set of passages relative to a reference ranking of the set of passages. In some cases, the evaluation LLM 420 may be implemented by a Microsoft Azure™ Open AI LLM (e.g., a GPT-4o, GPT-4 Turbo, GPT-4, or GPT-3.5 Turbo model).

Once an evaluation metric 438 has been generated, the one or more feedback LLMs 422, 424 are used to generate textual feedback 440 on the set of one or more ranking ("R") prompt 428 to improve the evaluation metric 438. The feedback 440 may be in the form of textual suggestions on how the set of one or more ranking ("R") prompt 428 may be improved and/or textual criticisms of the set of one or more ranking ("R") prompt 428.

In one example, in accordance with the TextGrad framework, the textual feedback 440 may be considered to represent the textual gradient of the evaluation metric 438 with respect to the set of one or more ranking ("R") prompt 428. Similar to how a numerical gradient for a neural network can be computed via backpropagation, a textual gradient can also be generated via backpropagation. Specifically, the evaluation metric can be backpropagated through the LLM system. For example, in the example LLM system of FIG. 4 that comprises the ranking LLM 412 and the evaluation LLM 420, to improve the set of one or more ranking prompt 428 with respect to the evaluation metric 438 we want to calculate the textual gradient of the evaluation metric 438 with respect to the set of one or more ranking prompt 428

$$\left(\frac{\partial\, evaluationmetric}{\partial\, rankingprompt}\right)$$

which, using the chain rule, can be expressed using equation (1) where $$\left(\frac{\partial\, evaluationmetric}{\partial\, \text{ranking}}\right)$$

represents the textual gradient of the evaluation metric 438 with respect to the ranking 434 generated by the ranking LLM 412.

$$\frac{\partial\, evaluationmetric}{\partial\, rankingprompt} = \frac{\partial\, \text{ranking}}{\partial\, rankingprompt} \circ \frac{\partial\, evaluationmetric}{\partial\, \text{ranking}} \tag{1}$$

Thus, the textual gradient of the evaluation metric 438 with respect to the set of one or more ranking prompt 428

$$\left(\frac{\partial\, evaluationmetric}{\partial\, rankingprompt}\right)$$

can be generated by (1) generating the textual gradient of the evaluation metric with respect to the ranking 434 generated by the ranking LLM 412

$$\left(\frac{\partial\, evaluationmetric}{\partial\, \text{ranking}}\right)$$

and (2) generating the textual gradient of the evaluation metric 438 with respect to the set of one or more ranking prompt 428

$$\left(\frac{\partial\, evaluationmetric}{\partial\, rankingprompt}\right)$$

based on the textual gradient of the evaluation metric with respect to the ranking 434 generated by the ranking LLM 412

$$\left(\frac{\partial\, evaluationmetric}{\partial\, \text{ranking}}\right).$$

In other words, first textual feedback on how to improve the ranking to improve the evaluation metric $$\left(\frac{\partial\, evaluationmetric}{\partial\, \text{ranking}}\right)$$

is generated, then second textual feedback on how to improve the ranking prompt to improve the evaluation metric $$\left(\frac{\partial\, evaluationmetric}{\partial\, \text{ranking}}\right)$$

is generated from the first textual feedback.

This can be implemented, for example, as shown in FIG. 4, by using a first feedback LLM 422 to generate the first textual gradient i.e., the textual gradient of the evaluation metric with respect to the ranking 434 generated by the ranking LLM 412

$$\left(\frac{\partial\, evaluationmetric}{\partial\, \text{ranking}}\right);$$

and using a second feedback LLM 424 to generate the second textual gradient—i.e., the textual gradient of the evaluation metric 438 with respect to the set of one or more ranking prompt 428

$$\left(\frac{\partial\, evaluationmetric}{\partial\, rankingprompt}\right)$$

—based on the first textual gradient.

Using the first feedback LLM 422 to generate the first textual gradient—i.e., the textual gradient of the evaluation metric with respect to the ranking 434 generated by the ranking LLM 412

$$\left(\frac{\partial evaluationmetric}{\partial \text{ranking}}\right)$$

—may comprise providing the first feedback LLM 422, with the inputs and outputs of the evaluation LLM 420 (i.e., the reference ranking 436, the ranking 434 generated by the ranking LLM 412, the evaluation ("E") prompt 442, and the evaluation ("E") metric 438) and a first feedback ("1F") prompt 444 which causes the first feedback LLM 422 to provide first textual feedback ("FEEDBACK 1") 446 on how to improve the ranking 434 so as to improve the evaluation metric. In other words, the first feedback LLM 422 is provided with the conversation with the evaluation LLM 420 and asked to provide feedback on the ranking based thereon. An example simple first feedback ("1F") prompt 444 is shown below. This is just an example first feedback prompt and other (e.g., more detailed) first feedback prompts may be used.

Here is a conversation with a language model (ML) wherein the ranking is {ranking} and the reference ranking is {reference ranking}:

{evaluation prompt}

{evaluation metric}

Explain how to improve the ranking {ranking}.

Using the second feedback LLM 424 to generate the second textual gradient—i.e., the textual gradient of the evaluation metric with respect to the ranking 434 generated by the ranking LLM 412

$$\left(\frac{\partial evaluationmetric}{\partial rankingprompt}\right)$$

—may comprise providing the second feedback LLM 424, with the inputs and outputs of the ranking LLM 412 (i.e., the test set of passages 430, the test query 432, the set of one or more ranking prompt 428, and the ranking 434 generated by the ranking LLM 412), the first textual feedback 446 and a second feedback ("2F") prompt 448 which causes the second feedback LLM 424 to provide textual feedback on how to improve the set of one or more ranking prompt 428 (e.g. the system prompt thereof) based on the first textual feedback 446. In other words, the second feedback LLM 424 is provided with the conversation with the ranking LLM 412, the feedback on how the ranking can be improved, and is asked to generate feedback on how the set of one or more ranking prompt 428 can be improved. An example simple second feedback ("2F") prompt 448 is shown below. This is just an example and that other (e.g., more detailed or complex) second feedback prompts may be used.

Here is a conversation with a language model:

{ranking prompt}

{ranking}

Here is feedback on how the ranking can be improved:

{first feedback}

Explain how to improve the ranking prompt {ranking prompt}.

As described above, LLMs are a class of machine learning models that have been trained on massive amounts of data so that they can understand and generate natural language. The feedback LLMs 422, 424 may be implemented by any LLM that can provide textual feedback on how to improve a parameter. In some cases, the one or more of the feedback LLMs 422, 424 may be implemented by a Microsoft Azure™ Open AI LLM (e.g., a GPT-4o, GPT-4 Turbo, GPT-4, or GPT-3.5 Turbo model).

After the second feedback 440 (i.e., the feedback on the set of one or more ranking prompt 428) has been generated, a modified set of one or more ranking prompt 410 can be generated based on the feedback 440. In some cases, the modified set of one or more ranking prompt 401 is generated using an LLM, such as the optimizer LLM 426. For example, the optimizer LLM 426 may be provided with the second feedback 440 and the set of one or more ranking prompt 428 and an optimizer ("O") prompt 450 which instructs the optimizer LLM 426 to generate a modified set of one or more ranking prompt 410 (e.g., generate a modified system prompt thereof) based on the feedback. The following is a simple example optimizer ("O") prompt 450. However, this is just an example and other (e.g., more complicated and/or sophisticated) optimizer prompts may be used.

Below is the feedback on the ranking prompt {ranking prompt}:

{second feedback}

Incorporate the feedback and produce a new ranking prompt.

As described above, LLMs are a class of machine learning models that have been trained on massive amounts of data so that they can understand and generate natural language. The optimizer LLM 426 may be implemented by any LLM that can amend a query based on feedback received on that query. In some cases, the optimizer LLM 426 may be implemented by a Microsoft Azure™ Open AI LLM (e.g., a GPT-4o, GPT-4 Turbo, GPT-4, or GPT-3.5 Turbo model).

Once a modified set of one or more ranking prompt 410 has been generated, the modified set of one or more ranking prompt 410 can be used in the second system 414 to cause the ranking LLM 412 (which is shown twice in FIG. 4 for readability) to generate a ranking 452 of a set of passages 454 (from the set of documents 404) based on their relevance to a query 456.

In some cases, the query 456 may be received from a user via, for example a user interface 458. In some cases, the query 456 is provided by a client device 320 that is connected over a data communication link 460 to the user interface 458. For example, a user may input a query 456 via a web browser 462 or some other application that operates on the client device 320. In particular, when the user accesses a certain web page via the web browser 462, they may be provided with a text field or the like where the user can enter the query 456.

As described in more detail below, in some cases, the set of passages 454 may be identified by an information retrieval system as being relevant to the query 456.

Where the objective is to improve the set of one or more ranking prompt 428 to improve the performance of the ranking LLM 412 in ranking any set of passages from the set of documents 404 with respect to any query (i.e., the objective is to obtain an improved generalized set of one or more ranking prompt) then there may be multiple different (test set of passages, test query, reference rankings) triples that relate to different subject matter in the set of documents 404, and the ranking, evaluation and feedback generation using the ranking LLM 412, evaluation LLM 420 and feedback LLMs 422, 424 may be performed for each of a plurality of the triples using the same set of one or more ranking prompt 428 such that feedback for modifying the set of one or more ranking prompt 428 is generated for each of the plurality of triples. The plurality of triples may be referred to as a batch. In such cases, the optimizer LLM 426 may be configured to generate the modified set of one or more ranking prompt 410 based on the feedback for each of the triples in a batch. Specifically, the optimizer LLM 426 may be provided with the set of one or more ranking prompt 428 and the final feedback 440 generated for each triple in the batch, and an optimizer prompt that instructs the optimizer LLM 426 to generate a modified set of one or more ranking prompt 428 based on the final feedback for each triple in the batch.

In some cases, the process of generating feedback on a set of one or more ranking prompt and modifying the set of one or more ranking prompt based on the feedback may be iterative. For example, in some cases, feedback on a set of one or more ranking prompt may be generated for each (test set of passages, test query, reference ranking) triple in a batch (which may include one or more triples) and the set of one or more ranking prompt may be modified based on the feedback; feedback may be then generated on the modified set of one or more ranking prompt for each (test set of passages, test query, reference ranking) triple in a batch, and the set of one or more ranking prompt used in this iteration is modified based on the feedback generated in this iteration and so on. The triples uses in one iteration may the same or different than the triples in another iteration. In some cases, the generating of feedback on a set of one or more ranking prompt and modifying the set of one or more ranking prompt based on the feedback may be repeated a predetermined number of times. In other cases, the generating of feedback on a set of one or more ranking prompt and modifying the set of one or more ranking prompt based on the feedback may be repeated until the evaluation metric reaches a predetermined level or threshold.

Testing has shown that through such an iterative process the set of one or more ranking prompt may be modified to include information that aids the ranking LLM 412 in understanding the context/domain of, and/or lingo in, the corpus of documents so that the ranking LLM 412 can better understand and rank passages from the corpus of documents. Generating a modified set of one or more ranking prompt in accordance with the methods and systems described herein can generate an improved set of one or more ranking prompt much more quickly and efficiently than the previously discussed manual process. This can save time and computing resources.

Example RAG System

In some cases, the ranking LLM 412 and the modified set of one or more ranking prompt 410 may be used to perform re-ranking in a retrieval augmented generation (RAG) system that is designed to provide a response to a query based on a corpus of documents.

Specifically, there are many applications where it may be useful to be able to generate a response to a query based on a private or non-public corpus of documents (e.g., documents internal to an enterprise). For example, an enterprise may have a set of agents that receive enquiries from customers about products and services offered by the enterprise. While information that resolves the customer's query can generally be found in the enterprise's internal and/or external documents it may be cumbersome for an agent (or another enterprise employee) to locate information relevant to a customer's query in the internal and/or external documents. It is desirable to generate an answer to the customer's query in a more efficient and automated way.

With the emergence of large language models (LLMs) and their ability to generate understand and generate human-like text based on patterns they recognize, LLMs seem well suited to automatically generate responses to queries. However, while LLMs are trained on a vast amount of data from various fields, if the query relates to information that is not known to the LLM (e.g., information that did not form part of the LLM's training dataset)—because, for example, the information relates to a specific domain or to an enterprise's internal knowledge base—the LLM may not be able to provide an accurate answer to the query. Accordingly, a technique referred to as retrieval augmented generation (RAG) has been developed. In RAG, a query is first sent to an information retrieval (IR) system to retrieve information from an external knowledge base (external to the data used to train the LLM) which comprises, for example, documents etc. related to a specific domain and/or an enterprise's internal documents etc.; then the retrieved information and the original query are provided to an LLM along with instructions to generate a response to the query based on the provided information. In this way the external knowledge base is used to enhance the LLM's output without having to re-train the LLM.

Figure 5:
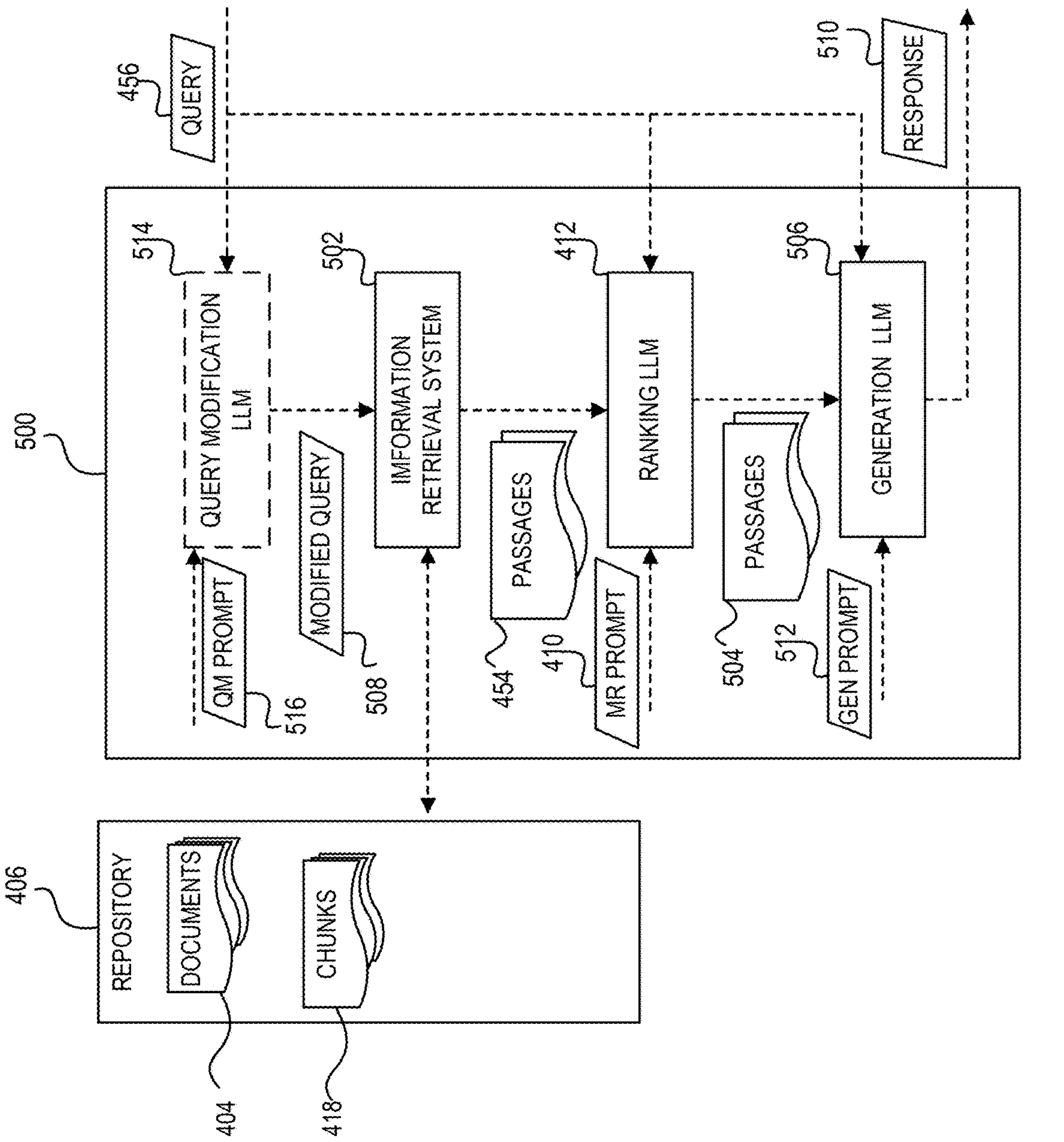
FIG. 5 is a block diagram of an example retrieval augmented generation (RAG) system that comprises the ranking LLM and the modified set of one or more ranking prompt of FIG. 4.

Reference is now made to FIG. 5 which shows an example RAG system 500 which comprises the ranking LLM 412 of FIG. 4 which may be implemented by, for example, the cloud-based computing cluster 306.

Specifically, the system 500 is configured to receive a query 456; use an information retrieval system 502 to obtain a set of passages 454 from the set of documents 404 that are relevant to the query 456; use the ranking LLM 412 of FIG. 4 to re-rank the set of passages 454 based on their relevance to the query 456 using the modified set of one or more ranking prompt 410; select a subset of passages 504 based on the ranking; and use a generation LLM 506 to generate a response to the query based on the subset of passages 504.

The information retrieval system 502 is configured to receive a query (which may be the original query 456 or as described below a modified query 508) and identify and retrieve a set of passages (from the set of documents 404) that are relevant to the received query. As described above, each passage may be all of a document in the set of documents 404 or a portion of a document in the set of documents 404, such as a chunk of the set of chunks 418.

An information retrieval (IR) system is a system that can identify and retrieve passages in a corpus of documents that are relevant to the query by comparing the query (or a representation thereof) to each passage (or a representation thereof). An information retrieval system generally starts by creating a search index of the passages in the corpus of documents. Indexing a set of passages is the process of organizing and categorizing passages in a way that makes them easily searchable. The search index generally comprises, searchable fields, which represent information in the passages. There are many different techniques which may be used to index a set of passages. Once the index has been generated, passages relevant to a query are identified by comparing the query (or a representation of the query) to the searchable fields in the search index; generating a relevance score for the passages based on the comparisons; and selecting one or more passages as being relevant to the query based on the relevance score. For example, the information retrieval system may select the k passages with the best relevance scores.

One example technique for indexing a set of passages is tokenization. In tokenization, a tokenizer divides the text in each field of each document into tokens (e.g., each token may represent a single word) and may discard some characters, such as punctuation. An optional token filter may then be used to manipulate the generated tokens. A token filter may be used to, for example: normalize the token (e.g., all text may be converted to small letters); remove stop-words such as "the", "and" and "is"; and/or split some tokens (e.g., tokens that represent phone numbers) into smaller tokens. The tokens may then be stored in an inverted index, which allows for fast, full-text search. An inverted index enables full-text search by mapping all of the unique terms to the document in which they were found. As noted above, there may be an inverted index for each searchable field. So, if there is a title search field and a passage search field, there may be an inverted index for each field. When the search index is generated via tokenization, passages relevant to a query are identified by performing simple or full text queries on the inverted indexes. This may comprise parsing the query to identify terms and operations. The inverted indexes are then searched to find matching terms and each match is assigned a relevance score. The result set is then sorted based on a relevance score assigned to each matching document. The relevance score may be based on statistical properties of terms that match. For example, in some cases the relevance score (and thus a ranking of) the passages may be determined in accordance with the Best Match 25 (BM25) algorithm. BM25 is a ranking algorithm that ranks a set of passages based on the query terms appearing in each passage, regardless of their proximity within the passage.

Another example technique which may be used to index a set of passages is vectorization. In vectorization each passage is converted or transformed, by an embedding model, into a plurality of embeddings which are stored as a multi-dimensional vector. The multi-dimensional vector is an array of (floating point) numbers that captures the semantic meaning of the passage. In other words, the multi-dimensional vector is a numeric representation of the content of a passage. The multi-dimensional vector can be understood as defining a point in multi-dimensional space, and the distance between two vectors indicates the semantic similarity between the respective passages/queries from which the vectors were generated. Different embedding models may generate a different number of embeddings. For example, the text-embedding-ada-002 embedding model generates 1,536 embeddings for each passage.

Figure 2:
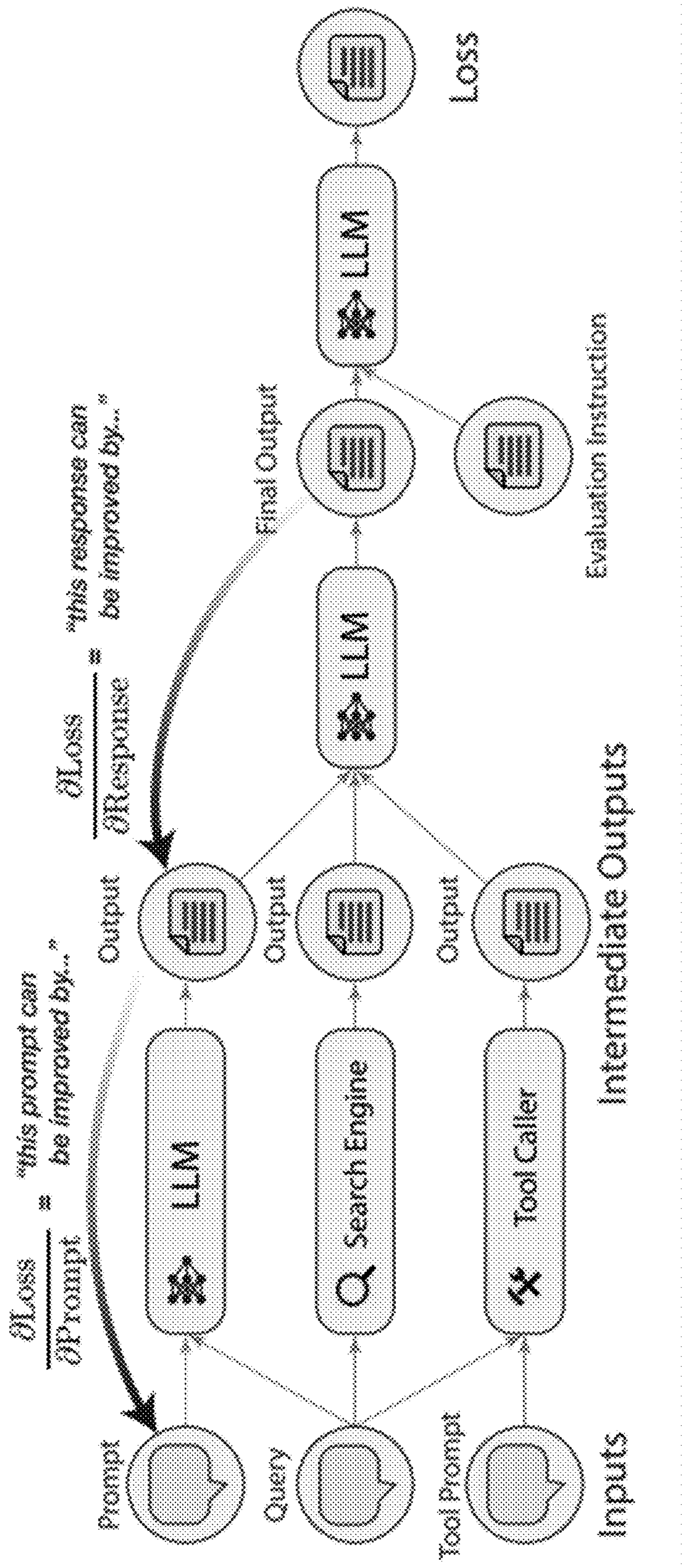
FIG. 2 is a schematic diagram illustrating backpropagating a loss in the output an example LLM system through the LLM system to generate a textual gradient of the loss with respect to an input variable.

Different embedding models are also designed to be good at different tasks. For example, a similarity embedding model is good at capturing the semantic similarity between texts; a text search embedding model, such as text-embedding-ada-002, is good at determining whether a long document is relevant to a short query. Since the objective of the information retrieval system 220 of FIG. 2 is to identify passages that are relevant to an input query, it may be beneficial to use a text search embedding model, such as, but not limited to, text-embeeding-ada-002.

The generated vectors are stored in the search index as a searchable field. When the search index is generated by vectorization, passages relevant to a query can be identified by converting the query into a plurality of embeddings (i.e., multi-dimensional vector), using the same embedding model used to generate the passage embeddings, and comparing the query multi-dimensional vector to the passage multi-dimensional vectors to find the passage multi-dimensional vectors that are closest to the query multi-dimensional vector. In some cases, similarity metrics can be calculated using the Hierarchical Navigable Small World (HNSW) algorithm or Exhaustive K-nearest neighbors (KNN).

In some cases, tokenization and vectorization may be used in combination. For example, both tokenized search fields and vectorized search fields may be generated and a search may be performed on both types of fields in parallel. The result for an individual document/chunk may be based on the combination of the text search results and the vector search results.

Accordingly, the information retrieval system 502 of FIG. 5 is configured to index the passages using any suitable method to generate a search index (e.g., tokenization, vectorization, a combination of tokenization and vectorization etc.). The indexing may be performed off-line—i.e., prior to receiving queries—and may only be performed initially and, optionally, after a change to the set of documents 404—instead of being performed for each query. The information retrieval system 502 is then configured to receive a query and identify and retrieve a set of passages 454 that are relevant to the query by searching the search index. Specifically, the information retrieval system 502 is configured to receive a certain number of passages that are most similar to the received query. The number of chunks that are retrieved may be configurable.

As described above, while information retrieval systems are very efficient and effective at organizing and sorting through a large corpus of documents, they may not be able to accurately rank the passages they retrieve. Accordingly, the ranking LLM 412 of FIG. 4 is used to rank the set of passages 454 retrieved by the information retrieval system 502 based on their relevance to the original query 456 using the modified set of one or more ranking prompt 410 generated by the first system of FIG. 4.

In some cases, the modified set of one or more ranking prompts 410 may cause the ranking LLM 412 to, in addition to ranking the passages, select a subset of passages 504 based on the ranking. However, in other examples, another module, such as a subset selection module (not shown) may be configured to receive the ranking of the set of passages generated by the ranking LLM 412 and select the subset of passages 504 based on the ranking.

Once the subset of passages 504 has been selected from the ranking of the set of passages 454 retrieved by the information retrieval system 502, the generation LLM 506 is used to generate a response 510 to the original query 456 based on the subset of passages 504. Specifically, the generation LLM 506 is provided with the subset of passages 504, the original query 456 and a generation ("GEN") prompt 512 which instructs the generation LLM 506 to generate a response 510 to the original query 456 based on the subset of passages 504. The response 510 may be free-form text that attempts to answer the original query 456. An example generation ("GEN") prompt 512 is shown below.

Given the following query and passages, please generate a summarized response to the query using the text of the passages. Keep your answer grounded in the facts of the passages.
Query: {query}
Passage 1: {passage 1}
Passage 2: {passage 2}
Passage 3: {passage 3}

The response 510 generated by the generation LLM 506 may be provided to a user (e.g., the user that input the original query). In some cases, the response 510 is provided to a client device 320 via a user interface 458.

In some cases, prior to providing the response 510 to the user, an LLM (one of the LLMs in FIG. 5 or a different LLM) may be used to determine whether the response is supported by documents corresponding to the subset of chunks.

In some cases, the system 500 may also comprise a query modification LLM 514 that is used to perform query expansion on the original query 456 to generate a modified query 508 and it is the modified query 508 that is provided to the information retrieval system 502 instead of the original query 456. Query expansion is a technique in which a query is changed or modified to include additional information to improve the quality of the query. Query expansion can overcome issues with the original query such as, but not limited to, missing keywords, ambiguity or specificity. By incorporating terms and concepts that did not exist in the original query, query expansion can more clearly capture the meaning and context of the user's request which can result in more relevant passages being retrieved by the information retrieval system 502.

Specifically, the query modification LLM 514 is provided the original query 456 and a query modification ("QM") prompt 516 which instructs the query modification LLM 514 to generate synthetic information related to the original query 456. A modified query 508 is then generated from the synthetic information. The query modification ("QM") prompt 516 may be configured to instruct the query modification LLM 514 to generate any suitable synthetic information related to the original query 456. For example, in some cases, the query modification ("QM") prompt 516 may be configured to instruct the query modification LLM 514 to generate a set of keywords for the original query 456. An example of such a prompt is shown below.

Provide a set of keywords for the following query: {query}

In other cases, the query modification ("QM") prompt 516 may be configured to instruct the query modification LLM 514 to: generate a passage that answers the original query 456, wherein the synthetic information is the passage; provide a concise rationale to the original query 456 and think step by step, wherein the synthetic information is the rationale; or generate an answer to the original query 456 and give the rational wherein the rationale is the synthetic information.

In yet other cases, the query modification LLM 514 may be provided with additional information that aids in generating the synthetic information. For example, in some cases, prior to providing the query modification ("QM") prompt 516 and the original query 456 to the query modification LLM 514, the original query 456 may be provided to the information retrieval system 502 to retrieve the passage closest to the query 456. Then, the query 456, the retrieved passage, and a query modification ("QM") prompt 516 is provided to the query modification LLM 514, wherein the query modification ("QM") prompt 516 instructs the query modification LLM 514 to generate the synthetic information (e.g., keywords, passage, rationale) given the context of the returned passage. It will be evident that these are examples only and that the query modification ("QM") prompt 516 may be configured to instruct the query modification LLM 514 to generate any suitable synthetic information related to the original query 456. It has been determined that generating a set of keywords words well in many cases.

In some cases, the modified query 508 is generated from the generated synthetic information by combining the original query 456 and the synthetic information generated by the query modification LLM 514. For example, the original query 456 and the synthetic information generated by the query modification LLM 514 (e.g., the keywords, passage or rationale generated by the query modification LLM 514) may be concatenated. In other cases, the modified query 508 is generated by replacing the original query 456 with the synthetic information. In other words, in these cases, only the synthetic information forms part of the modified query 508.

In some cases, the query modification ("QM") prompt 516 causes the query modification LLM 514 to generate the modified query 508 from the generated synthetic information. However, in other examples, another module, such as a modified query generation module (not shown) may be configured to receive the original query 456 and the synthetic information generated by the query modification LLM 514 and generate the modified query 508 therefrom.

Example Computer

Figure 6:
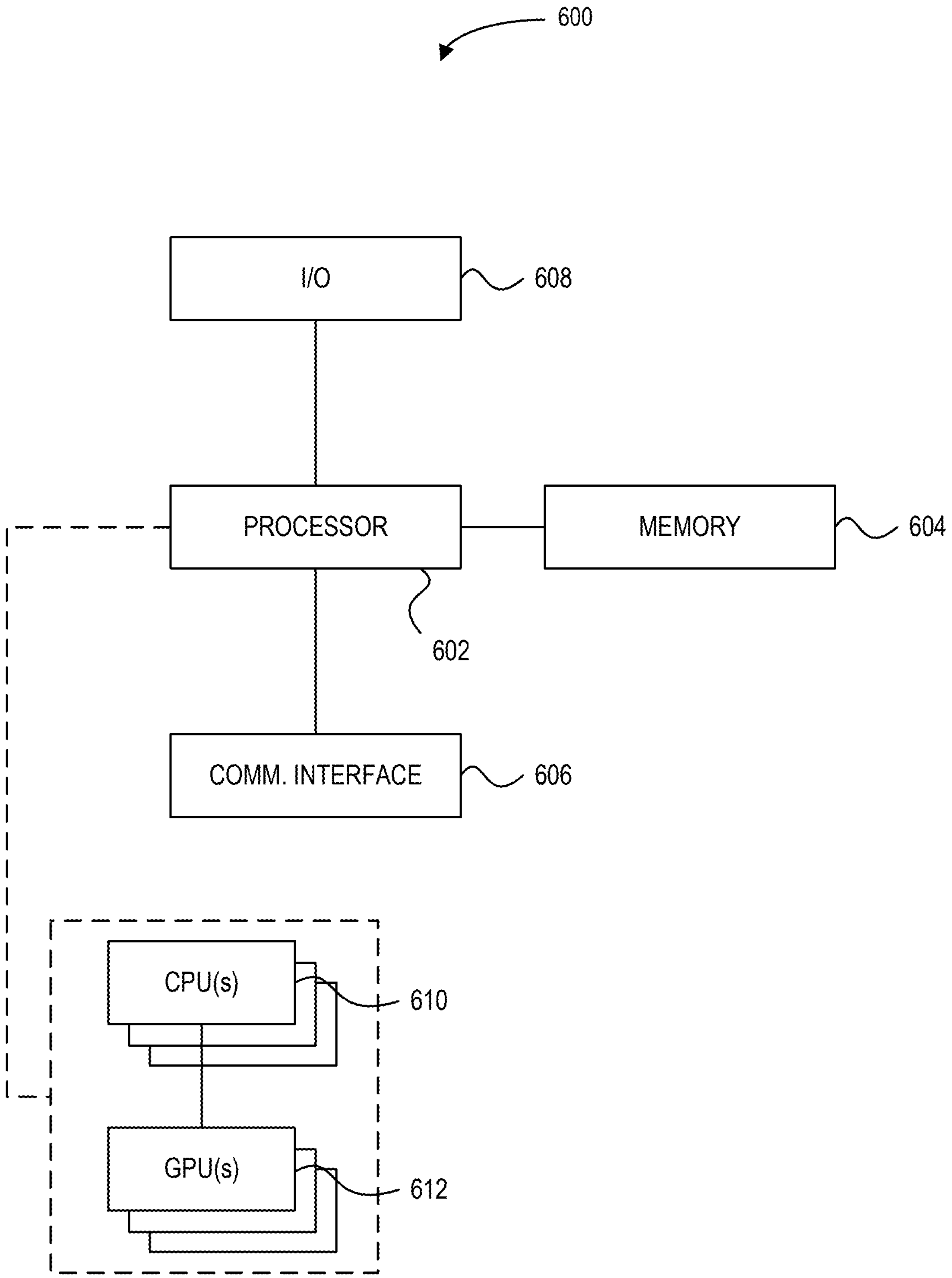
FIG. 6 is a block diagram of an example computer.

Reference is now made to FIG. 6 which illustrates a simplified block diagram of an example computer 600. Computer 600 is an example implementation of a computer which may implement the source database system 302, EDPP 304, one or more components of the cloud-based computing cluster 306 of FIGS. 3 and 4. Computer 600 has at least one processor 602 operatively coupled to at least one memory 604, at least one communications interface 606 (also referred to herein as a network interface), and at least one input/output (I/O) device 608.

The at least one memory 604 includes a volatile memory that stores instructions executed or executable by the processor 602, and input and output data used or generated during execution of the instructions. The memory 604 may also include non-volatile memory used to store input and/or output data—e.g., within a database—along with program code containing executable instructions.

The processor 602 may transmit or receive data via the communications interface 606 and may also transmit or receive data via any additional input/output device 608 as appropriate.

In some cases, the processor 602 includes a system of central processing units (CPUs) 610. In other cases, the processor 602 includes a system of one or more CPUs 610 and one or more Graphical Processing Units (GPUs) 612 that are coupled together. For example, any combination of the LLMs 412, 420, 422, 424, 426, 506 described herein may execute neural network computations on CPU and GPU hardware, such as the system of CPUs 610 and GPUs 612 of FIG. 6.

Example Method

Figure 7:
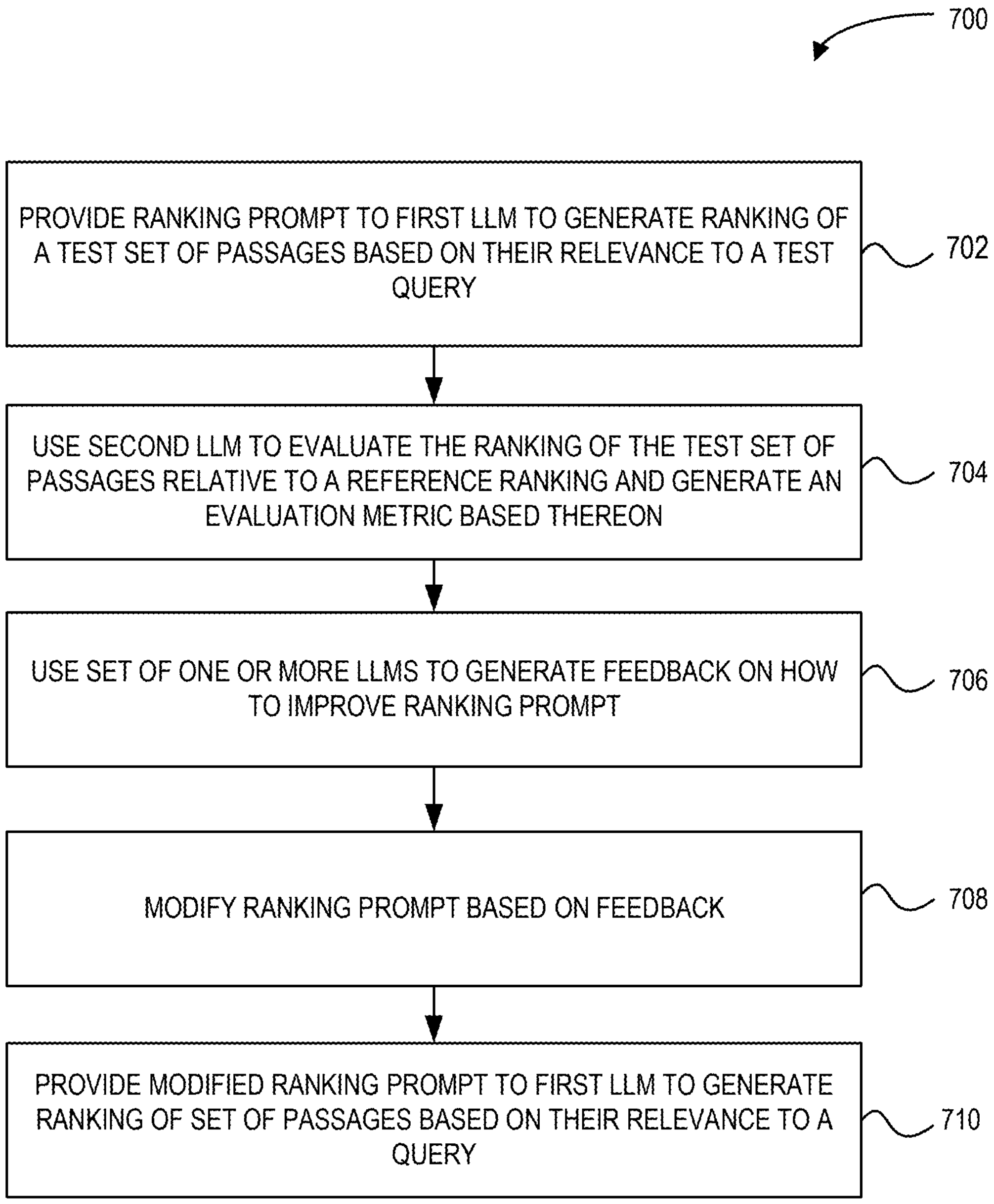
FIG. 7 is a flow diagram of an example method for ranking a set of passages based on their relevance to a query.

Reference is now made to FIG. 7 which illustrates an example method 700 for ranking a set of passages with respect to a corresponding query, for example, by the first and second systems 408 and 414 of FIG. 4. The method 700 may implemented by one or more processors of a computer.

The method 700 begins at block 702 where a set of one or more ranking prompt is provided to a first LLM (e.g., ranking LLM 412) which causes the first LLM to generate a ranking of a test set of passages (e.g., from a corpus of documents) based on their relevance to a test query. The test set of passages and corresponding test query may be selected as being a set of passages from a corpus of documents for which a reference ranking of that set of passages was generated (e.g., by an expert of the corpus of documents) relative to the test query. Examples of the set of one or more ranking prompt were described above. Once the first LLM has generated the ranking of the test set of passages, the method 700 proceeds to block 704.

At block 704, a second LLM (e.g., evaluation LLM 420) is used to generate an evaluation metric indicating a quality of the ranking of the test set of passages relative to a reference ranking of the test set of passages. In some cases, the reference ranking may be considered to be the ground truth, or correct, ranking of the test passages with respect to the test query. As described above, the reference ranking may be generated by an expert of the corpus of documents from which the passages are selected. Using the second LLM (e.g., evaluation LLM 420) to generate the evaluation metric may comprise providing the second LLM (e.g., evaluation LLM 420) with the ranking generated by the first LLM (e.g., ranking LLM 412), the reference ranking and an evaluation prompt (e.g., evaluation ("E") prompt 442) which causes the second LLM (e.g., evaluation LLM 420) to generate an evaluation metric based on an evaluation of the ranking of the test set of passages relative to the reference ranking of the test set of passages. Example evaluation prompts were described above. Once the evaluation metric has been generated, the method 700 proceeds to block 706.

At block 706, a set of one or more LLMs (e.g., feedback LLMs 422, 424) are used to generate, based on the test set of passages, the test query, the ranking of the test set of passages and the evaluation metric, textual feedback on the set of one or more ranking prompt. In some cases, the set of one or more LLMs (e.g., feedback LLMs 422, 424) may be used to generate the textual feedback by backpropagating the evaluation metric to the set of one or more ranking prompt. For example, as described above, in some cases, using the set of one or more LLMs (e.g., feedback LLMs 422, 424) to generate the textual feedback may comprise (i) using a first feedback LLM (e.g., first feedback LLM 422), to generate first textual feedback on how to improve the ranking generated by the first LLM based on the inputs provided to, and outputs of, the second LLM (e.g., evaluation LLM 420); and (ii) using a second feedback LLM (e.g., second feedback LLM 424) to generate the textural feedback on the set of one or more ranking prompt based on the inputs provided to, and outputs from, the first LLM (e.g., ranking LLM 412) and the first feedback.

Once the textual feedback on the set of one or more ranking prompt has been generated, the method 700 proceeds to block 708.

At block 708, a modified set of one or more ranking prompt is generated based on the textual feedback generated in block 706. In some cases, a third LLM (e.g., optimizer LLM 426) may be used to generate the modified set of one or more ranking prompt. In some cases, using a third LLM (e.g., optimizer LLM 426) to generate the modified set of one or more ranking prompt may comprise providing the third LLM (e.g., optimizer LLM 426) the original set of one or more ranking prompt, the textual feedback and an optimizer prompt (e.g., optimizer ("O") prompt 450) which causes the third LLM (e.g., optimizer LLM 426) to generate a modified set of one or more ranking prompt based on the textural feedback. Example, optimizer prompts were provided above. Once the modified set of one or more ranking prompt has been generated, the method 700 proceeds to block 710.

At block 710, the modified set of one or more ranking prompt generated in block 708 is provided to the first LLM (e.g., ranking LLM 412) to cause the first LLM to rank a set of passages based on their relevance to the query. The method 700 may then end.

As described above, in some cases, blocks 702, 704 and 706 may be executed multiple times with different (set of test passages, test query, reference ranking) triples before block 708 is executed and in such cases block 708 may take into account all of the triples and the feedback generated therefore in generating the modified set of one or more ranking prompt. Specifically, for each of a plurality of (set of test passages, test query, reference ranking) triples, a ranking of the set of test passages based on their relevance to the test query may be generated by the first LLM (e.g., ranking LLM 412), and the modified set of one or more ranking prompt may be generated based on the feedback generated from each of the plurality of triples.

As described above, in some cases, the process of generating feedback on a set of one or more ranking prompt and modifying the set of one or more ranking prompt based on the feedback may be iterative. For example, in some cases, feedback on a set of one or more ranking prompt may be generated via blocks 702, 704, and 706 for each (test set of passages, test query, reference ranking) triple in a batch (which may include one or more triples) and, at block 708, the set of one or more ranking prompt may be modified based on the feedback; feedback may be then generated on the modified set of one or more ranking prompt for each (test set of passages, test query, reference ranking) triple in a batch via blocks 702, 704 and 706, and, at block 708, the set of one or more ranking prompt used in this iteration is modified based on the feedback generated in this iteration and so on. The triples used in one iteration may be the same triples or different triples used in another iteration. In some cases, the generating of feedback on a set of one or more ranking prompt and modifying the set of one or more ranking prompt based on the feedback may be repeated a predetermined number of times. In other cases, the generating of feedback on a set of one or more ranking prompt and modifying the set of one or more ranking prompt based on the feedback may be repeated until the evaluation metric reaches a predetermined level or threshold.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context.

Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g., 112*a*, or 112*b*). All elements with a common base number may be referred to collectively or generically using the base number without a suffix (e.g., 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g., a pushbutton keyboard, mouse, a touchscreen, and the like), and at least one output device (e.g., a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A system for ranking a set of passages based on their relevance to a query, the system comprising:

a memory, a communication interface, and at least one processor operatively coupled to the memory and the communication interface;

the at least one processor configured to:

(a) provide a set of one or more ranking prompt to a first large language model (LLM) which causes the first LLM to generate a ranking of a test set of passages based on their relevance to a test query;

(b) execute a second LLM to generate an evaluation metric indicating a quality of the ranking of the test set of passages relative to a reference ranking of the test set of passages;

(c) backpropagate the evaluation metric to the set of one or more ranking prompt using a set of one or more LLMs to generate a textual gradient of the evaluation metric with respect to the set of one or more ranking prompt, the textual gradient comprising textual feedback on the set of one or more ranking prompt;

(d) generate a modified set of one or more ranking prompt based on the textual feedback; and (e) provide the modified set of one or more ranking prompt to the first LLM which causes the first LLM to rank the set of passages based on their relevance to the query.

2. The system of claim 1, wherein backpropagating the evaluation metric to the set of one or more ranking prompt using the set of one or more LLMs to generate the textual gradient with respect to the set of one or more ranking prompt comprises (i) using the set of one or more LLMs to generate textual feedback on the ranking of the test set of passages based on the evaluation metric, and (ii) using the set of one or more LLMs to generate the textual feedback on the set of one or more ranking prompt based on the textual feedback on the ranking of the test set of passages.

3. The system of claim 2, wherein backpropagating the evaluation metric to the set of one or more ranking prompt using the set of one or more LLMs to generate the textual gradient with respect to the set of one or more ranking prompt comprises providing an LLM of the set of one or more LLMs the evaluation metric, inputs to the second LLM which caused the second LLM to generate the evaluation metric, and a first feedback prompt that causes the LLM of the set of one or more LLMs to generate the textual feedback on the ranking of the test set of passages.

4. The system of claim 3, wherein the inputs to the second LLM which caused the second LLM to generate the evaluation metric comprises the ranking of the test set of passages, the reference ranking of the test set of passages, and an evaluation prompt which caused the second LLM to generate the evaluation metric.

5. The system of claim 3, wherein backpropagating the evaluation metric to the set of one or more ranking prompt using the set of one or more LLMs to generate the textual gradient with respect to the set of one or more ranking prompt comprises providing another LLM of the set of one or more LLMs with the textual feedback on the ranking of the test set of passages, the ranking of the test set of passages, inputs to the first LLM which caused the first LLM to generate the ranking of the test set of passages, and a second feedback prompt that causes the other LLM of the set of one or more LLMs to generate the textual feedback on the set of one or more ranking prompt.

6. The system of claim 5, wherein the inputs to the first LLM which caused the first LLM to generate the ranking of the test set of passages comprises the test set of passages, the test query, and the set of one or more ranking prompt.

7. The system of claim 1, wherein generating the modified set of one or more ranking prompt based on the textual feedback comprises using a third LLM to generate the modified set of one or more ranking prompt based on the set of one or more ranking prompt and the textual feedback.

8. The system of claim 7, wherein using the third LLM to generate the modified set of one or more ranking prompt based on the set of one or more ranking prompt and the textual feedback comprising providing the third LLM the set of one or more ranking prompt, the textual feedback and an optimizer prompt which instructs the third LLM to generate the modified set of one or more ranking prompt based on the one or more ranking prompt and the textual feedback.

9. The system of claim 1, wherein each passage in the test set of passages and the set of passages comprises all or a portion of a document in a corpus of documents.

10. The system of claim 9, wherein the at least one processor is configured to execute (a) to (c) for each of a plurality of different test set of passages from the corpus of documents to generate textual feedback on the set of one or more ranking prompt for each of the plurality of different test set of passages; and the modified set of one or more ranking prompt is based on the textual feedback on the set of one or more ranking prompt for each of the plurality of different test set of passages.

11. The system of claim 1, wherein the at least one processor is configured to, prior to executing (e), repeat (a) to (d) with the modified set of one or more ranking prompt.

12. The system of claim 1, wherein the textual feedback on the set of one or more ranking prompt comprises interpretable natural language describing how the set of one or more ranking prompt should be changed to improve the evaluation metric.

13. The system of claim 1, wherein the set of one or more ranking prompt comprises a system prompt and modifying the set of one or more ranking prompt comprises modifying the system prompt.

14. The system of claim 1, wherein the at least one processor is further configured to:

receive the query; and generate a response to the query based on the ranking of the set of passages based on their relevance to the query.

15. The system of claim 14, wherein the at least one processor is further configured to:

use an information retrieval system to identify, from a corpus of documents, the set of passages, wherein the passages in the set of passages are relevant to the query; and wherein generating the response to the query based on the ranking of the set of passages based on their relevance to the query comprises:

selecting a subset of the set of passages based on the ranking of the set of passages; and using an LLM to generate the response to the query based on the subset of the set of passages.

16. A method for ranking a set of passages based on their relevance to a query, the method executed in a computing environment comprising at least one processor, a communication interface, and memory, and the method comprising:

(a) providing a set of one or more ranking prompt to a first large language model (LLM) which causes the first LLM to generate a ranking of a test set of passages based on their relevance to a test query;

(b) executing a second LLM to generate an evaluation metric indicating a quality of the ranking of the test set of passages relative to a reference ranking of the test set of passages;

(c) backpropagating the evaluation metric to the set of one or more ranking prompt using a set of one or more LLMs to generate a textual gradient of the evaluation metric with respect to the set of one or more ranking prompt, the textual gradient comprising textual feedback on the set of one or more ranking prompt;

(d) generating a modified set of one or more ranking prompt based on the textual feedback; and (e) providing the modified set of one or more ranking prompt to the first LLM which causes the first LLM to rank the set of passages based on their relevance to the query.

17. The method of claim 16, wherein backpropagating the evaluation metric to the set of one or more ranking prompt using the set of one or more LLMs to generate the textual gradient with respect to the set of one or more ranking prompt comprises (i) using the set of one or more LLMs to generate textual feedback on the ranking of the test set of passages based on the evaluation metric, and (ii) using the set of one or more LLMs to generate the textual feedback on the set of one or more ranking prompt based on the textual feedback on the ranking of the test set of passages.

18. The method of claim 16, wherein generating the modified set of one or more ranking prompt based on the textual feedback comprises using a third LLM to generate the modified set of one or more ranking prompt based on the set of one or more ranking prompt and the textual feedback.

19. A non-transitory computer readable medium storing computer executable instructions which, when executed by at least one computer processor, cause the at least one computer processor to carry out a method for ranking a set of passages based on their relevance to a query, the method comprising:

(a) providing a set of one or more ranking prompt to a first large language model (LLM) which causes the first LLM to generate a ranking of a test set of passages based on their relevance to a test query;

(b) executing a second LLM to generate an evaluation metric indicating a quality of the ranking of the test set of passages relative to a reference ranking of the test set of passages;

(c) backpropagating the evaluation metric to the set of one or more ranking prompt using a set of one or more LLMs to generate a textual gradient of the evaluation metric with respect to the set of one or more ranking prompt, the textual gradient comprising textual feedback on the set of one or more ranking prompt;

(d) generating a modified set of one or more ranking prompt based on the textual feedback; and (e) providing the modified set of one or more ranking prompt to the first LLM which causes the first LLM to rank the set of passages based on their relevance to the query.

* * * * *